(12) United States Patent  (10) Patent No.: US 7,506,925 B2
Rutherford  (45) Date of Patent: Mar. 24, 2009

(54) SEAT (76) Inventor: Jeri Rutherford, 7306 Bruneau Hwy., Marsing, ID (US) 83639

( * ) Notice: Subject to any disclaimer, the term of this patent is extended or adjusted under 35 U.S.C. 154(b) by 305 days.

(21) Appl. No.: 11/455,621

(22) Filed: Jun. 19, 2006

(65) Prior Publication Data
US 2007/0290534 A1    Dec. 20, 2007

(51) Int. Cl.
B62J 1/02    (2006.01)
(52) U.S. Cl. ............... 297/195.1; 297/215; 297/215.16
(58) Field of Classification Search ............. 297/195.1, 297/214, 215.16, 452.55, 452.56, 215
See application file for complete search history.

(56) References Cited

U.S. PATENT DOCUMENTS

| 253,504 | A | * | 2/1882 | Burley | 297/197 |
| 492,375 | A | * | 2/1893 | Steers | 297/199 |
| RE11,350 | E | * | 7/1893 | Bergfels | 297/204 |
| 512,008 | A | * | 1/1894 | Cavanaugh | 297/215 |
| 3,104,129 | A | * | 9/1963 | Mack | 297/215.16 |
| 3,146,024 | A | * | 8/1964 | Timms | 297/215.16 |
| 3,682,509 | A | * | 8/1972 | Worley | 297/195.1 |
| 4,062,585 | A | * | 12/1977 | Herring, Jr. | 297/195.1 |
| 6,010,188 | A | * | 1/2000 | Yates | 297/215 |
| 6,106,059 | A | * | 8/2000 | Minkow et al. | 297/202 |
| 6,260,919 | B1 | * | 7/2001 | Yates | 297/215 |
| 7,059,673 | B1 | * | 6/2006 | Lee | 297/195.1 |
| 7,367,619 | B2 | * | 5/2008 | Fregonese et al. | 297/195.1 |

* cited by examiner

Primary Examiner—Peter R. Brown
(74) Attorney, Agent, or Firm—Pedersen & Co., PLL; Ken J. Pedersen; Barbara S. Pedersen (57) ABSTRACT In one embodiment, a seat includes a stiff substantially continuous first sheet suspended at three points on a stiff substantially continuous second sheet. In one embodiment, the first sheet defines a generally flat first wing and a first nose projecting forward from a center of the first wing, the second sheet defines a bow shaped second wing and a second nose projecting forward from a center of the second wing, and the second wing is positioned under the first wing such that left and right sides of the first wing are supported on uplifted ends of the second wing and the first nose is supported on the second nose.

16 Claims, 8 Drawing Sheets

SEAT

BACKGROUND

There are comfortable bicycle seats and there are high performance bicycle seats and, perhaps, even a few comfortable high performance bicycle seats. A long and honorable tradition has developed over the last century seeking more comfortable and better performing bicycle seats. In the spirit of this time honored tradition, a new seat was developed in an effort to improve bicycle riding comfort while providing desirable riding performance characteristics. Embodiments of the new seat, therefore, will be described with reference to a bicycle seat. The new seat, however, is not limited to bicycle seats but may be embodied in other seats used in other environments or applications.

DETAILED DESCRIPTION

Figure 1:
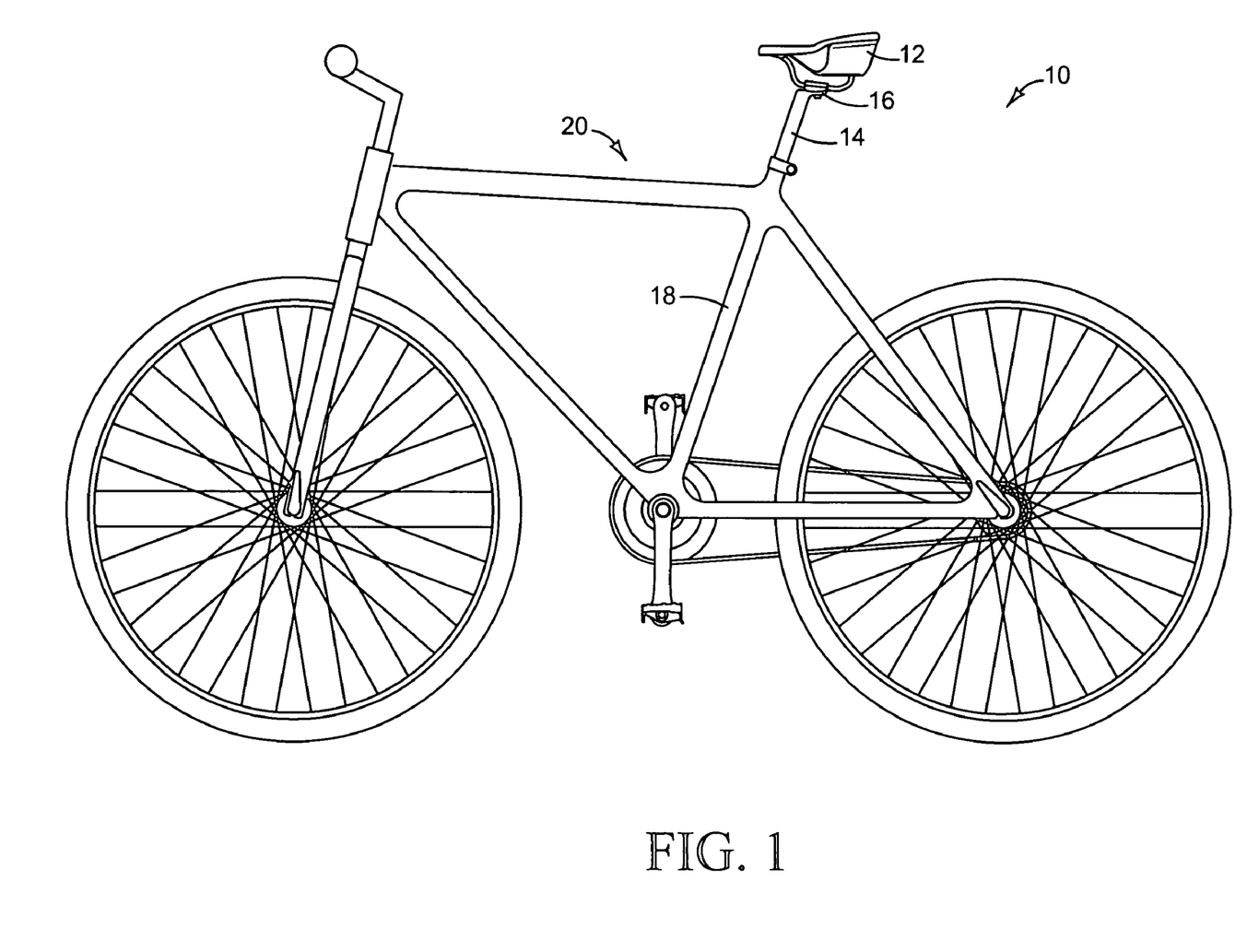
FIG. 1 illustrates a bicycle with a seat according to one embodiment of the invention.
Figure 2:
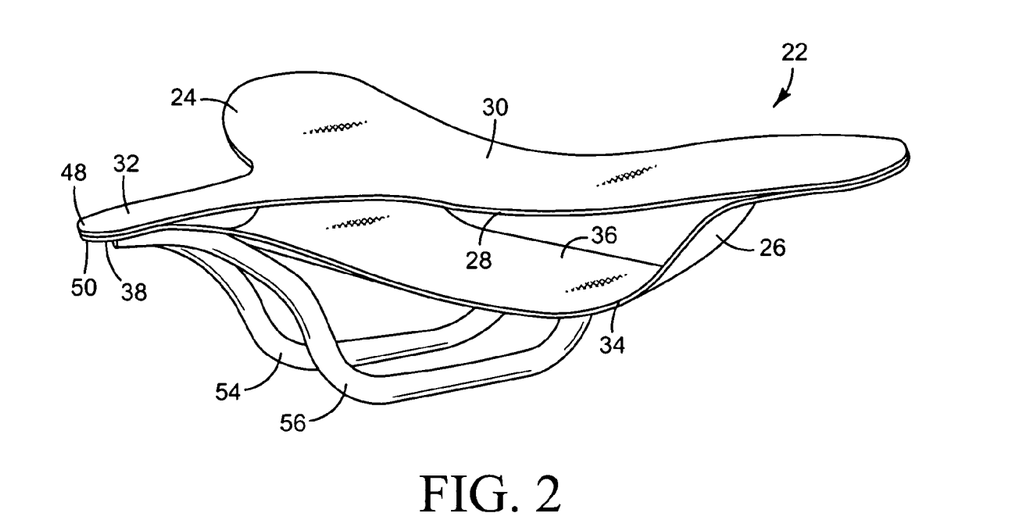
FIGS. 2, 3 and 4 are perspective, front elevation and rear elevation views, respectively, of one exemplary embodiment of a bicycle seat such as might be used for the seat on the bicycle shown in FIG. 1.
Figure 3:
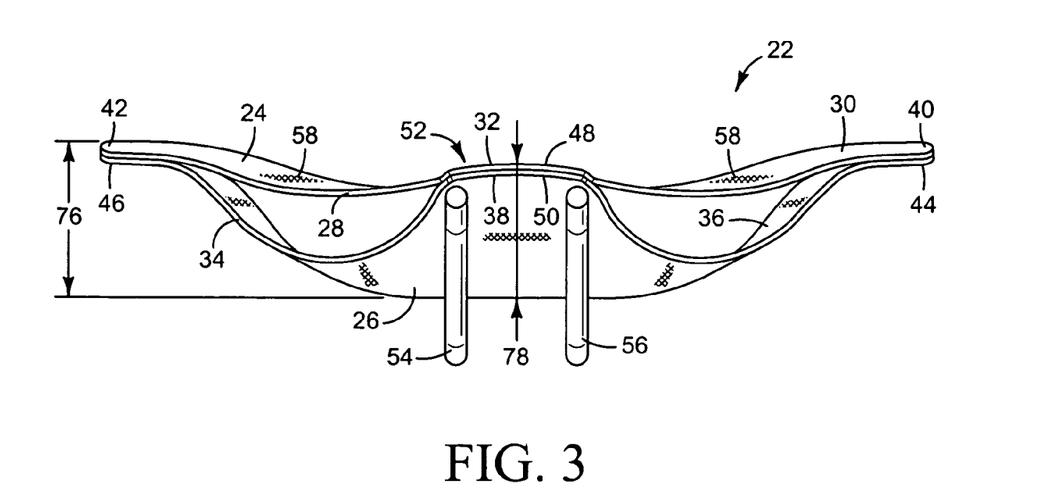
Figure 4:
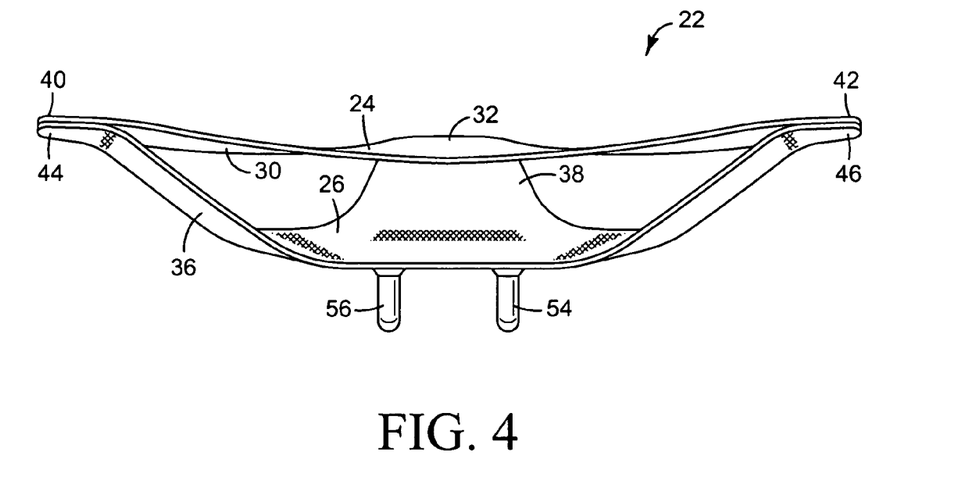
Figure 5:
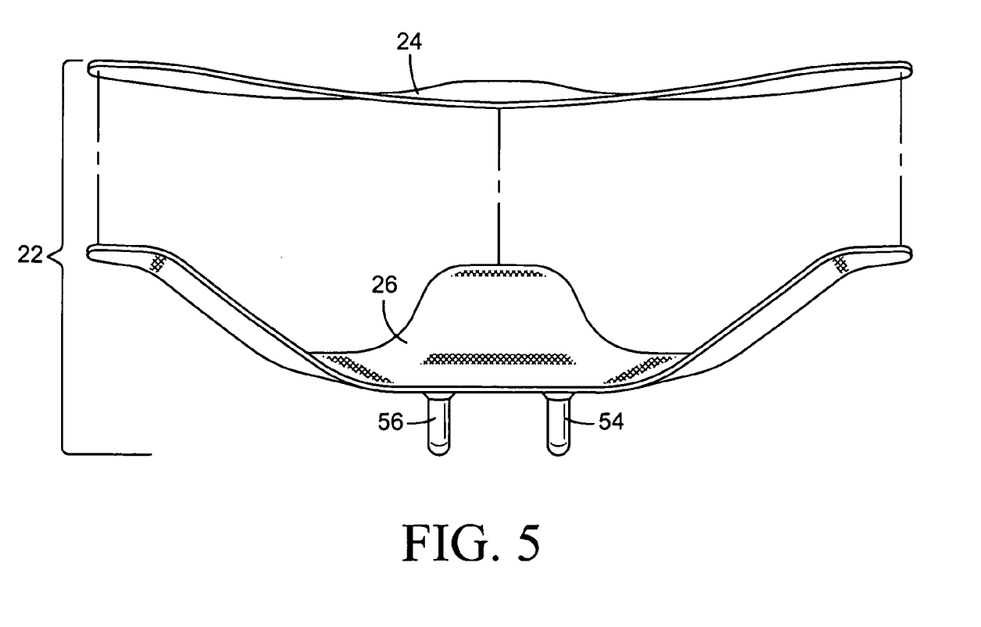
FIG. 5 is an exploded rear elevation view of the seat shown in FIGS. 2-4.
Figure 6:
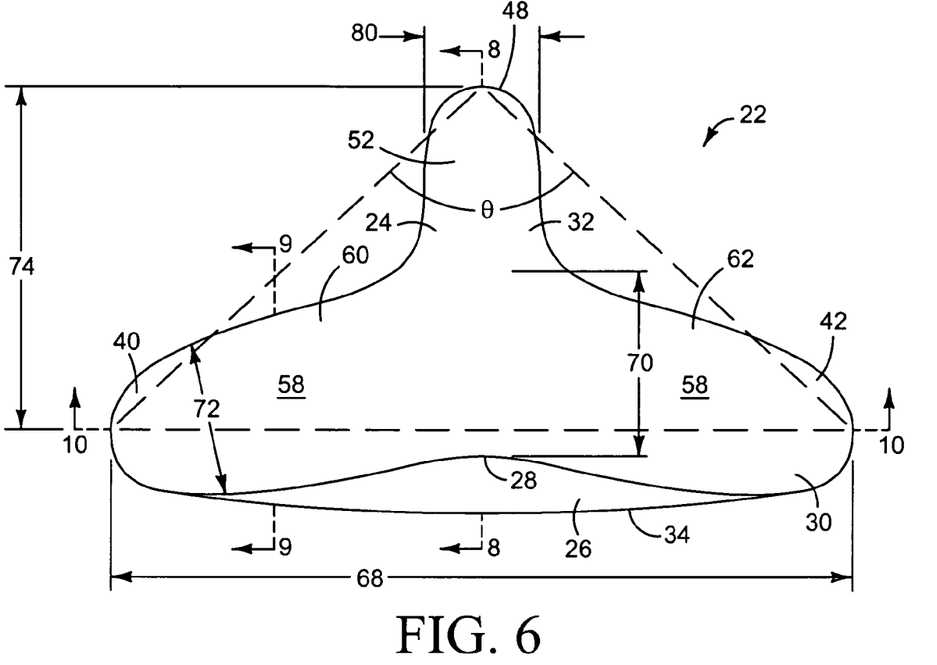
FIGS. 6 and 7 are top down and bottom up plan views, respectively, of the seat shown in FIGS. 2-4.
Figure 7:
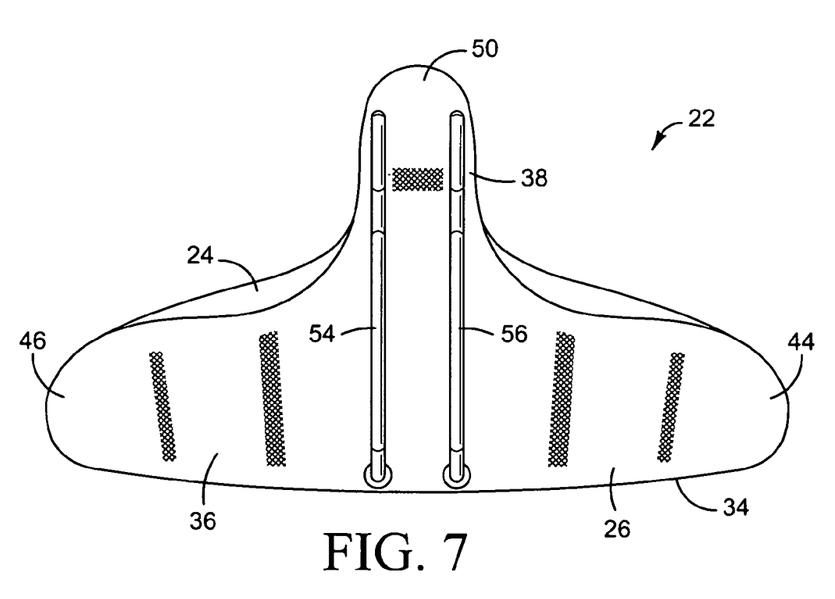
Figure 8:
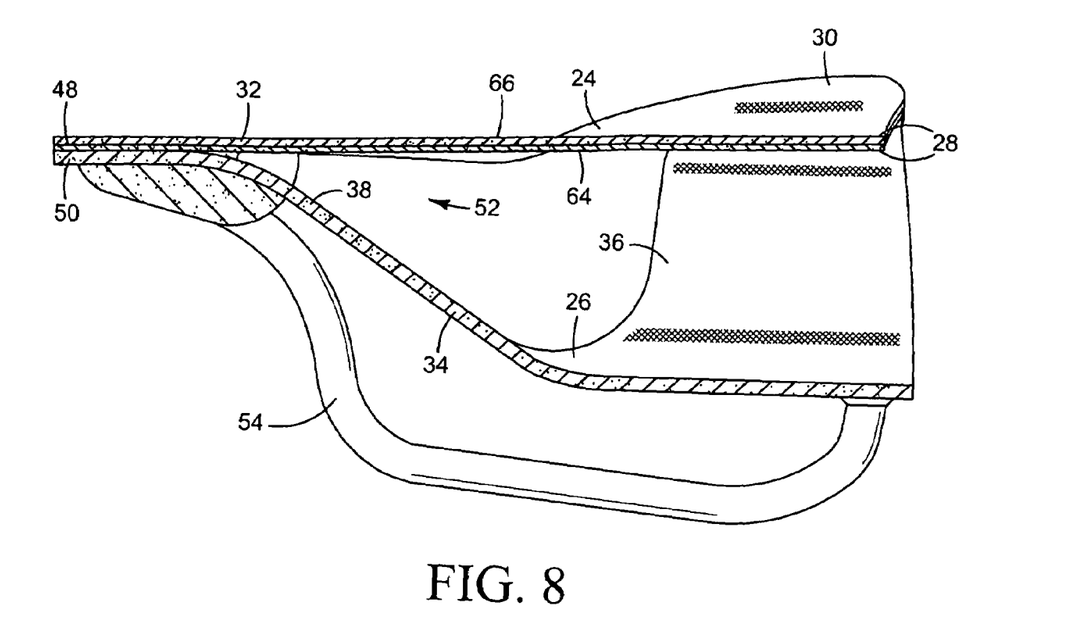
FIGS. 8, 9 and 10 are enlarged section views taken along the lines 8-8, 9-9 and 10-10 in FIG. 6. The scale of the drawings is greater in the section views of FIGS. 8, 9 and 10 compared to the scale in FIG. 6 to show the layering in the seat.
Figure 9:
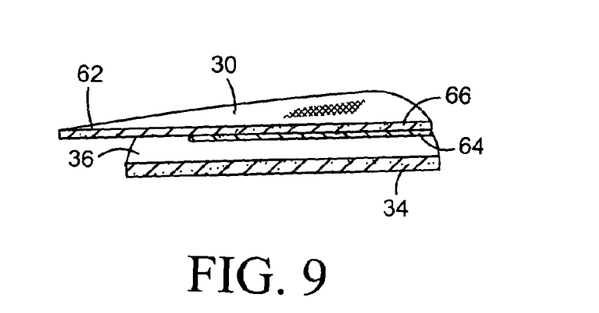
Figure 10:
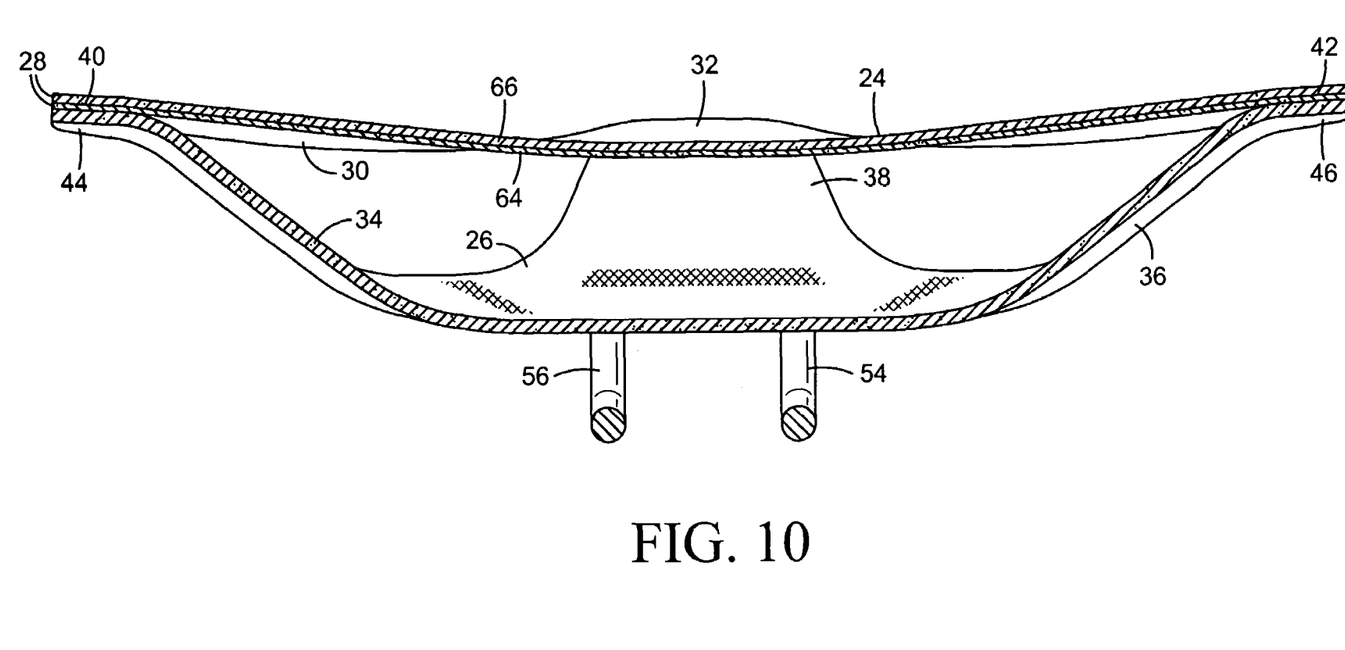

FIG. 1 illustrates a bicycle 10 that includes a seat 12 mounted to a seat post 14 through a bracket 16. Seat post 14 is secured in seat tube 18 of bicycle frame 20. FIGS. 2, 3 and 4 are perspective, front elevation and rear elevation views, respectively, of one embodiment of a bicycle seat 22 such as might be used for seat 12 in the bicycle 10 shown in FIG. 1. FIG. 5 is an exploded rear elevation view of seat 22. FIGS. 6 and 7 are top down and bottom up plan views, respectively, of seat 22 and FIGS. 8, 9 and 10 are section views taken along the lines 8-8, 9-9 and 10-10 in FIG. 6.

Referring to FIGS. 2-10, seat 22 includes a platform 24 supported on a base 26. As best seen in FIGS. 2 and 6, platform 24 is a stiff and substantially continuous sheet 28 shaped generally like a puffy, shallow Y. The Y shaped platform sheet 28 is characterized by a wing 30 forming the legs of the Y and a nose 32 projecting forward from the center of wing 30 forming the stem of the Y. A rider's buttocks are positioned on the left and right sides of wing 30 and the rider's crotch is positioned over nose 32 when the rider is seated on platform 24. As best seen in FIGS. 2 and 7, base 26 is a stiff and substantially continuous sheet 34 shaped generally like a puffy T. The T shaped base sheet 34 is characterized by a bow shaped wing 36, best seen in FIGS. 3, 4 and 10, forming the cross bar of the T and a nose 38 projecting forward from the center of wing 36 forming the stem of the T. The Y shape is preferred for platform sheet 28 to conform to a rider's bottom and better distribute the rider's weight across seat 22. The shape of base sheet 34 will generally mimic the shape of platform sheet 28. A T shaped base sheet 34 mimics the Y shaped platform sheet 28 but is somewhat easier to manufacture than a Y shaped base sheet 34.

"Stiff" as used in this document means difficult but not impossible to flex; not flimsy. The degree of stiffness of sheets 28 and 34, and the corresponding degree of difficulty to flex the sheets, may be varied as necessary or desirable for specific riding applications. For example, one or both sheets 28 and 34 in a seat designed for a heavier competitive mountain bike rider may be stiffer (very difficult to flex) while one or both of sheets 28 and 34 in a seat designed for a light recreational road rider may be less stiff (not very difficult to flex). The stiffness of each sheet 28, 34 will vary depending on the type of material(s) from which they are constructed, the thickness of the material(s) and the construction (e.g., layering). The stiffness of platform sheet 28 in seat 22 also depends on the characteristics of its supporting base 26. Platform sheet 28, however, is itself stiff, wholly apart from the characteristics of base 26.

A "substantially continuous sheet" as used in this document means a sheet that is sufficiently continuous to behave substantially like a continuous sheet. While one or both sheets 28 and 34 may have holes in it, for cooling or to reduce weight for example, the size and number of holes should not affect the structural integrity of the sheet. A holed sheet should still behave like a fully continuous sheet.

A "wing" as used in this document means a structure that has a planar shape similar to the planar shape of a wing. For example, in the plan view of FIG. 6, platform wing 30 is shaped like a wing and, in the plan view of FIG. 7, base wing 36 is also shaped like a wing. Base wing 36 is shaped like a bow when viewed in elevation, as best seen in FIGS. 5 and 10. Wing as specially defined herein allows the compound shape of the rear portion of base 26 to be described simply as a bow shaped wing, rather than a sheet that is wing shaped when viewed in plan and bow shaped when viewed in elevation.

The bow shaped base wing 36 is positioned under platform sheet 28 such that the left and right sides 40, 42 of platform wing 30 are supported on the uplifted ends 44, 46 of bow shaped base wing 36 and the front part 48 of platform nose 32 is supported on the front part 50 of base nose 38. Base nose 38 extends up from base wing 36 to support platform nose 32, as best seen in FIGS. 3, 4 and 8, and form what is commonly referred to as the horn of the seat, designated by reference number 52 in the figures. Suspending platform sheet 28 on three points at the extremities of platform sheet 28 helps allow platform 24 to flex as the rider's weight shifts from side to side while pedaling. As the downward moving leg compresses one side, the flex in platform 24 helps lift the upward moving leg on the other decompressing side. The ends 44, 46 of base wing 36 may be flattened to form a recurved bow shape, as shown in the figures, to provide more contact area with platform sheet 28 and to help give base sheet 34 the desired degree of stiffness.

Referring to FIGS. 2-5 and 7, base 26 is secured to a pair of rails 54 and 56. Seat 22 is mounted to a bicycle by attaching rails 54 and 56 to the bicycle seat post, as illustrated in FIG. 1. Rails 54 and 56 extending the full length of seat 22, as shown in FIG. 7, helps improve the ability of the rails to absorb shock. Although rails 54 and 56 may be made from any suitably strong and durable material, it is expected that rails 54 and 56 typically will be made from a lightweight metal or metal alloy such as aluminum or titanium.

Figure 11:
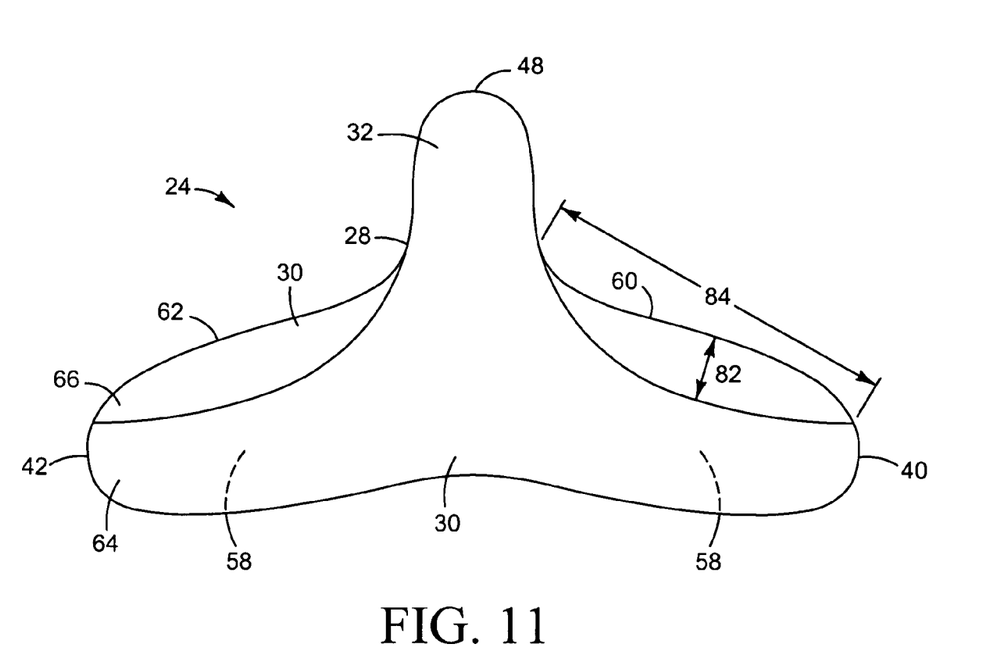
FIG. 11 is a bottom up plan view of the seating platform of the seat shown in FIGS. 2-4.

Platform 24 is constructed with a varying degree of stiffness to provide a corresponding varying degree of support for the rider, from a stiffer and stronger rear seating area 58 to less stiff and weaker front leg areas 60 and 62. Referring to the section views of FIGS. 8, 9 and 10 and to the bottom up plan view of platform 24 shown in FIG. 11, this varying degree of stiffness may be achieved, for example, by forming platform sheet 28 from a composite of two layers of material 64 and 66 at seating area 58 and only one layer of material (top layer 66) at the front leg areas 60 and 62. This configuration gives platform 24 more stiffness and strength across seating area 58 and more flexibility in leg areas 60 and 62 to allow platform 24 to flex down with each leg extension. The transition from two layers to one layer at leg areas 60 and 62 is shown in FIGS. 9 and 11. Bottom layer 64 may be formed from a more stiff carbon fiber reinforced resin material and top layer 66 may be formed from a less stiff Kevlar® fiber reinforced resin material. Other configurations are possible. For example, platform sheet 28 may be formed from a single layer of material that is thicker (and hence more stiff) at seating area 58 and thinner (and hence less stiff) at leg areas 60 and 62.

Depending on the relative stiffness of platform 24 and base 26, it may be desirable to contour platform sheet 28 slightly to improve comfort and performance. For example, and referring to FIGS. 3 and 4, platform wing 30 rolls down gently from sides 40, 42 into a depressed center area 68. Platform nose 32 also rolls down gently from front part 48 back into a depressed center area to help center the rider comfortably on platform 24. Platform wing 30 may be twisted slightly as shown in FIGS. 3-5 so that platform 24 is a bit higher along the rear buttock area to better conform to the rider's bottom. A more conforming seat provides better weight distribution. Seat horn 52 is shorter than the horns on many conventional bicycle seats to help the rider to be able to actually sit on seat 22 and still pedal. The sides 40 and 42 of platform 24 also flair out from nose 32 much farther than many conventional bicycle seats to help keep the rider's weight distributed evenly on both sides of platform 24 even while one leg is fully extended.

In one exemplary configuration for seat 22, designed to support an aggressive rider weighing over 200 pounds. Platform sheet bottom layer 64 is formed from one or more layers of carbon fiber reinforced resin. Platform sheet top layer 66 is formed from one or more layers of Kevlar® fiber reinforced resin. Layers 64 and 66 are laminated together with a suitable bonding agent to form the composite platform sheet 28. Base sheet 34 is formed from one or more layers of carbon reinforced resin. Base sheet 34 is affixed to platform bottom layer 64 at the left and right sides 40, 42 of platform wing 30 and at the front part 48 of platform nose 32. A flexible resin such as a rubberized epoxy resin is preferred to minimize cracking or breaking. The number and thickness of the layers will vary depending on the expected use for seat 22. More and/or thicker layers may be desirable for heavier aggressive riders while fewer and/or thinner layers will be sufficient for lighter less aggressive riders. It is believed that the carbon fibers absorb and store energy, allowing the carbon fiber layers to act as shock absorbers. The bow shape of base wing 36 allows base sheet 34 to compress when loaded to absorb vibrations and shocks. The Kevlar® fiber layer(s) act to store the kinetic energy of the rider. As one side compresses, due to the rider's leg depressing the seat, the other side of the seat lifts the other leg, releasing the stored kinetic energy. The layering of platform sheet 28 is designed so that the leading edge leg areas 60 and 62 have greater flexibility (and ability to release energy) while the seating area 58 has lesser flexibility.

In this exemplary configuration, seat 22 is approximately 12.0 inches from side to side across seating area 58, as indicated by dimension 68 in FIG. 6, and 3.0 inches from front to rear across the center part of seating area 58, as indicated by dimension 70 in FIG. 6. Seating area 58 tapers from approximately 3.0 inches at the center (dimension 70) down to 2.5 inches near each side 40, 42 of platform wing 30, as indicated by dimension 72 in FIG. 6. Seat 22 is approximately 5.7 inches from the tip of horn 52 to the line traversing the widest part of platform wing 30 as indicated by dimension 74 in FIG. 6 and 2.3 inches from top to bottom at each side of seating area 58, as indicated by dimension 76 in FIG. 3. Each side 40, 42 of platform 24 is elevated slightly over the front of horn 52. Seat 22 is only approximately 2.0 inches from the top of horn 52 to the bottom of base 26, as indicated by dimension 78 in FIG. 3. Horn 52 is approximately 1.75 inches wide, as indicated by dimension line 80 in FIG. 6.

While these dimensions are specific for just this one exemplary configuration, they illustrate the relative geometries of some of the features of seat 22. For example, platform 24 is short and wide compared to most conventional bicycle seats. This short and wide geometry may be quantified with reference to an angle $\theta$, shown in FIG. 6, which is the vertex angle of an isosceles triangle formed by joining the three points of support on which platform 24 is suspended on base 26. An angle $\theta$ in the range of 74° to 93° characterizes the desired relationship between the length (relatively short) and width (relatively wide) of platform 24. In the embodiment described above for a heavy rider, in which seat 22 is approximately 12 inches wide and 5.7 inches long (measured from the tip of horn 52 to the line traversing the widest part of platform wing 30), angle $\theta$ is 93°. For a light rider, seat 22 may be only 8.5 inches wide and 5.7 inches long, giving an angle $\theta$ of 74°.

Continuing with the description of this exemplary configuration, and referring now to the bottom up plan view of platform sheet 28 in FIG. 11, platform sheet top layer 66 extends past bottom layer 64 at leg areas 60 and 62 approximately 1.0 inches at the widest point, as indicated by dimension 82 in FIG. 11. This single layer extends for approximately 5.7 inches from nose 32 to near the ends 40, 42 of wing 30, as indicated by dimension 84 in FIG. 11. This distance is expected to provide a comfortable degree of flexibility in platform leg areas 60 and 62 as the rider pumps his legs up and down while pedaling. As shown in the plan views of FIGS. 6 and 7, platform sheet 28 projects beyond base sheet 34 along leg areas 60 and 62.

Figure 12:
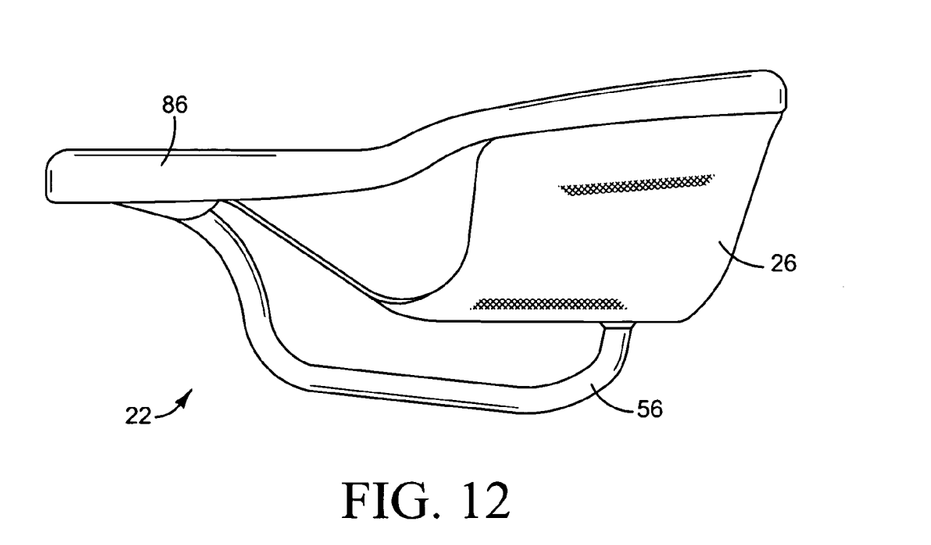
FIGS. 12, 13 and 14 are left side elevation, front elevation and rear elevation views, respectively, of the seat shown in FIGS. 2-4 with a padded cover.
Figure 13:
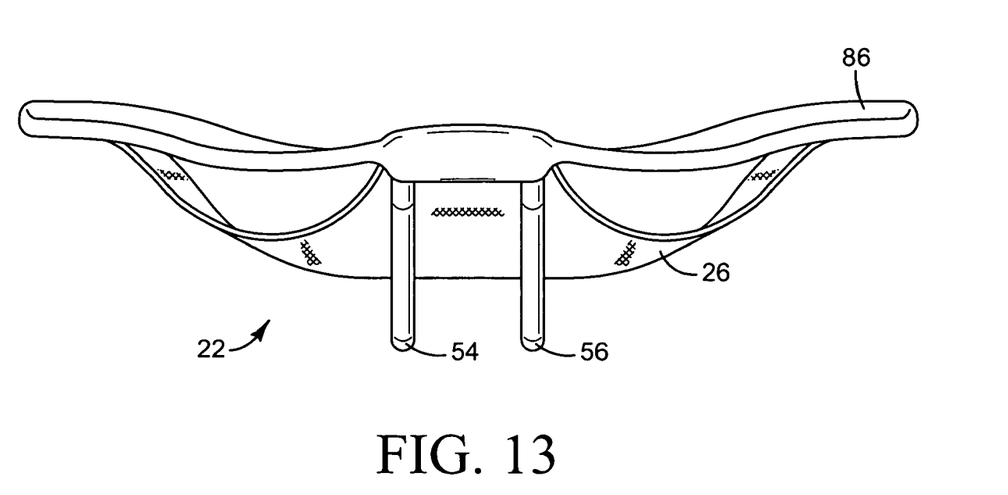
Figure 14:
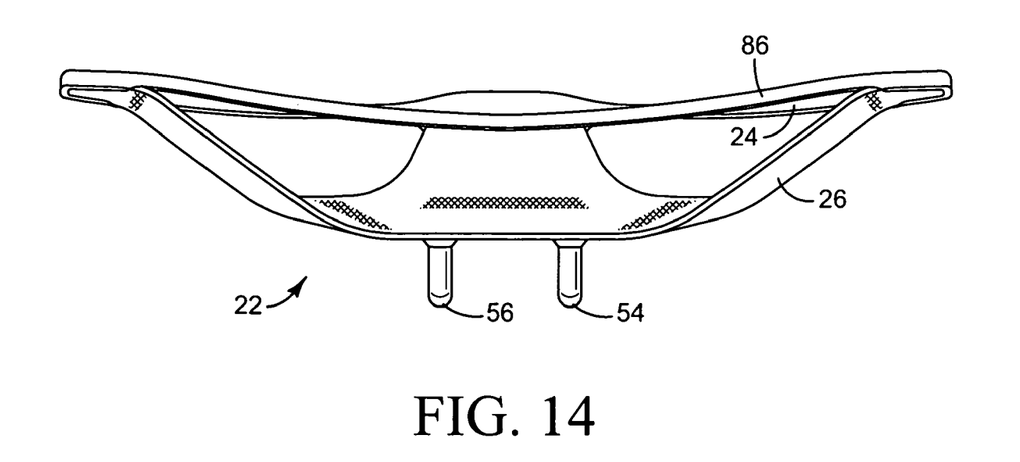

In the embodiment shown in FIGS. 12-14, seat 22 includes a padded cover 86 covering platform 24. Cover 86 may be constructed as one discrete integrated component or as separate padding and cover components. In either case, cover 86 wraps around the leading edge of platform 24 at leg areas 60 and 62 to help protect the rider's legs from the underlying sheet material. Depending on the specific configuration of platform sheet 28, it may be desirable to make cover 84 thicker at the extreme rear of platform 28 at the location of the sit bones to make the seat most comfortable The present invention has been shown and described with reference to the foregoing exemplary embodiments. It is to be understood, however, that other forms, details and embodiments may be made without departing from the spirit and scope of the invention which is defined in the following claims.

What is claimed is:

1. A seat comprising a stiff substantially continuous first sheet suspended at three support points on a stiff substantially continuous second sheet, wherein:

the first sheet comprises a generally flat first wing and a first nose projecting forward from a center of the first wing;

the second sheet comprises a bow shaped second wing and a second nose projecting forward from a center of the second wing;

the second wing is positioned under the first wing such that left and right sides of the first wing are supported on uplifted ends of the second wing and the first nose is supported on the second nose; and a leading edge of the first wing is formed from a single layer of a fiber reinforced resin material and the remainder of the first wing is formed from a plurality of layers of fiber reinforced resin material.

2. The seat of claim 1, wherein the three support points form the corners of an isosceles triangle having a vertex angle in the range of 74° to 93°.

3. The seat of claim 1, wherein a leading edge of the first wing has a first stiffness and the remainder of the first wing has a second stiffness greater than the first stiffness.

4. The seat of claim 1, wherein the first sheet is generally Y shaped and characterized by the first wing forming the legs of the Y and the first nose forming the stem of the Y.

5. The seat of claim 1, further comprising a padded cover covering an upper surface of the first sheet.

6. The seat of claim 1, comprising a rail that extends from a rear of the second sheet to a front of the second sheet for mounting the seat to a bicycle.

7. The seat of claim 6, wherein the rail comprises a pair of metal rails that extend generally parallel to one another from the rear of the second sheet to the front of the second sheet.

8. A seat comprising a stiff substantially continuous first sheet suspended at three support points on a stiff substantially continuous second sheet, wherein:

the first sheet comprises a generally flat first wing and a first nose projecting forward from a center of the first wing;

the second sheet comprises a bow shaped second wing and a second nose projecting forward from a center of the second wing;

the second wing is positioned under the first wing such that left and right sides of the first wing are supported on uplifted ends of the second wing and the first nose is supported on the second nose; and the first sheet is configured such that a user's buttocks are positioned on the left and right sides of the first wing and the user's crotch is positioned over the first nose when the user is seated on the seat;

a leading edge along each of the left and right sides of the first wing in front of the seating area is formed from a single layer of a fiber reinforced resin material; and the first sheet is formed from a plurality of layers of fiber reinforced material except at the single layer leading edges.

9. The seat of claim 8, wherein the three support points form the corners of an isosceles triangle having a vertex angle in the range of 74° to 93°.

10. The seat of claim 8, wherein a leading edge of the first wing has a first stiffness and the remainder of the first wing has a second stiffness greater than the first stiffness.

11. The seat of claim 8, wherein the first sheet is generally Y shaped and characterized by the first wing forming the legs of the Y and the first nose forming the stern of the Y.

12. The seat of claim 8, further comprising a padded cover covering an upper surface of the first sheet.

13. A bicycle seat, comprising:

a stiff substantially continuous first sheet defining a generally flat first wing and a first nose projecting forward from a center of the first wing, the first sheet configured such that a rider's buttocks are positioned on left and right sides of the first wing and the user's crotch is positioned over the first nose when the rider is seated on the seat, and a leading edge along each of the left and right sides of the first wing having a first stiffness and the remainder of the first wing having a second stiffness greater than the first stiffness;

a stiff substantially continuous second sheet defining a bow shaped second wing and a second nose projecting forward from a center of the second wing, the second wing positioned under the first wing such that the left and right sides of the first wing are supported on uplifted ends of the second wing and the first nose is supported on the second nose, the three support points forming the corners of an isosceles triangle having a vertex angle in the range of 74° to 93°;

a pair of rails that extend generally parallel to one another from the rear of the second sheet to the front of the second sheet, the rails configured for mounting the seat to a bicycle; and a padded cover covering a top of the first sheet.

14. The bicycle seat of claim 13, wherein the first sheet is generally Y shaped and characterized by the first wing forming the legs of the Y and the first nose forming the stem of the Y.

15. A bicycle seat, comprising:

a stiff substantially continuous first sheet defining a generally flat first wing and a first nose projecting forward from a center of the first wing, the first sheet configured such that a rider's buttocks are positioned on left and right sides of the first wing and the user's crotch is positioned over the first nose when the rider is seated on the seat, and a leading edge along each of the left and right sides of the first wing having a first stiffness and the remainder of the first wing having a second stiffness, wherein the second stiffness is greater than the first stiffness;

a stiff substantially continuous second sheet defining a bow shaped second wing and a second nose projecting forward from a center of the second wing, the second wing positioned under the first wing and supporting the first wing at three support points comprising the left and right sides of the first wing being supported on uplifted ends of the second wing and the first nose being supported on the second nose, the three support points forming the corners of an isosceles triangle having a vertex angle in the range of 74° to 93°; and a mount connected to the second sheet for mounting the seat to a bicycle.

16. The bicycle seat of claim 15, wherein the first sheet is generally Y shaped and characterized by the first wing forming the legs of the Y and the first nose forming the stem of the Y.

* * * * *